Patented Oct. 30, 1934

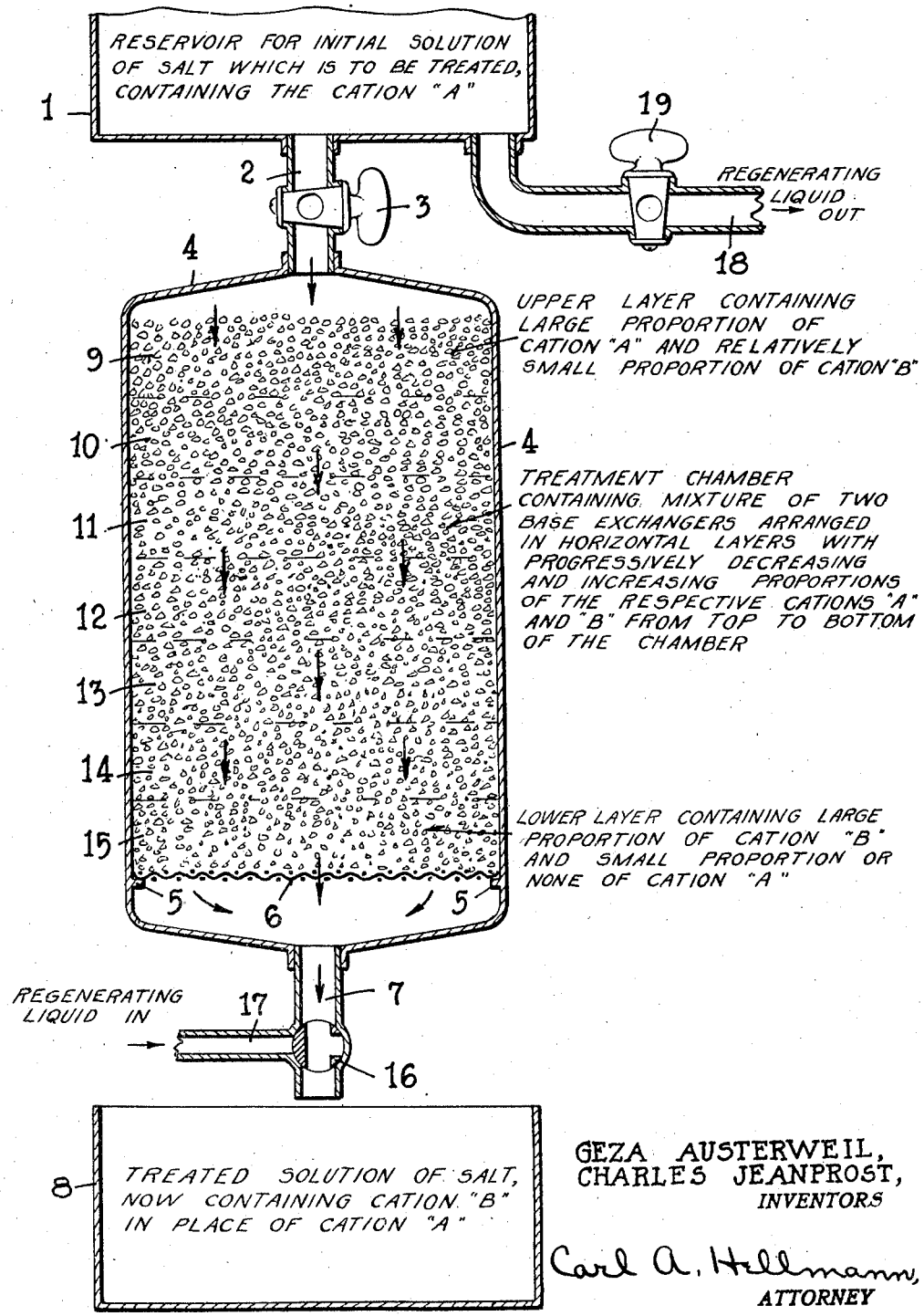

1,978,447

UNITED STATES PATENT OFFICE 1,978,447

PROCESS FOR THE PREPARATION, SEPARATION, AND PURIFICATION OF SALTS, SALT SOLUTIONS, AND OTHER SOLUTIONS

Géza Austerweil and Charles Jeanprost, Paris, France

Application June 6, 1932, Serial No. 615,762
In Germany June 2, 1931

10 Claims. (Cl 23—38)

This invention relates to processes for the preparation, separation, purification or sterilization of salts, salt solutions and other solutions, and makes it possible to carry out such processes by means of appropriate base exchange materials. Moreover, when employing the base exchange principles hereinafter referred to, no heat need be supplied.

It is well known that base exchange materials, synthetic as well as natural (for instance zeolites, glauconites, harmotones etc.) are capable of exchanging their bases or cations against bases or cations in aqueous solutions. This quality of the alumino-hydrosilicates which has already been used for the softening of boiler feed water was only known recently to be applicable to alkaline or earth-alkaline cations.

It has been shown lately, that these base-exchangers react also with heavy metal ions and one of the present inventors has shown that contrary to the hitherto accepted opinions, this capacity of exchanging cations is independent of the concentraticn of these cations in the reacting aqueous solutions up to a certain not altogether narrow limit. This permits the application of the base exchangers to a very wide range of the processes enabling them to be applied to the preparation, separation and purification of quite a number of different salts. It thus becomes possible, with the help of base-exchangers, to transform to a quantitative reaction certain chemical reactions between two solutions of salts which are completely soluble in water, so that equilibrium is overreached, even in cases in which the mixing of the two salt solutions with the presence of the base-exchangers would only have led to an equilibrium of the four possible resultant salts in the solution. By the process described it is possible to prepare and obtain separately in a high degree of purity, two salts in two separate solutions, if all the salts are perfectly soluble in water. With the help of these base exchangers it thus becomes possible, for example to prepare, with a nearly quantitative yield, potassium cyanide from sodium cyanide and potassium chloride, with scdium chloride, as a by-product. In the same way potassium nitrate may be prepared quantitatively from calcium nitrate and potassium chloride.

The process may, of course, be carried out in many different apparatus, but in order to better explain the same, a specific apparatus, which is suitable for the purpose, is disclosed in the accompanying drawing, the single figure of which shows an apparatus consisting of reservoirs for the initial solution and for the final product, with a treating vessel arranged between the same and receiving its input from the reservoir containing the initial solution and in turn discharging its output into the reservoir for the final product.

Referring now in detail to the drawing, there is shown an upper reservoir or tank 1 containing the initial salt solution which is to be treated, said salt containing the cation A. This reservoir is provided with an outlet pipe 2, provided preferably with a valve 3 for controlling the flow therethrcugh, and with a second outlet pipe 18, having a valve 19 therein. Below the reservoir 1, there is located a second vessel or reservoir 4, which has supporting means 5 near its lower end for holding a perforated or fabric member 6 adapted to support the base exchanger material, but permit liquid to flow freely through the same. This reseroir may have an outlet pipe 7 at its lower end to conduct the discharged liquid to the lower or receiving vessel 8.

It will be noted that the central vessel contains a mixture of base exchangers arranged preferably in horizontal layers, designated by reference characters 9 to 15 inclusive. These layers of base exchanger material are preferably made of progressively changing compositions, that is, the upper layer 9 may contain purely or almost purely a base exchanger material containing the cation A and a relatively small proportion or even none of cation B. The layer 10 next below this has a smaller proportion of the base exchanger material having the cation A, and a relatively larger portion of that containing the cation B, and so on down the vessel 4, each succeeding layer, in a descending direction, containing less and less of the cation A and more and more of the cation B, until the lower layer 15 contains practically entirely the cation B. Where cations are mentioned in this description of the drawing, it is understood, of course, that this term is used for simplicity of language and means a compound or base exchanger containing such cation as one of its components.

A valve 16 may be provided in the outlet pipe 7, this valve being preferably of the three-way type and a pipe 17 also leads to said valve for a purpose which will be explained hereinafter.

While the present drawing shows the material arranged in distinct layers it is obvious that it is not necessary to have a sharp line of demarkation between the layers, but they may blend into one another, the important feature being the progressive change from one cation to another in a vertical direction. Obviously, the number of layers is also unimportant and it should not be assumed from the fact that seven layers happen to be illustrated that this number is in any way essential.

In operation, the solution to be treated is placed in the container or reservoir 1, the top of which may, of course, be either open to the outer atmosphere or closed, depending upon the chemical nature of the substance being treated, and the solution is then allowed to pass at the proper rate through the central vessel or reservoir 4, which is here shown as closed at the upper end, whereupon the liquid in passing through the said container 4 will be converted into a liquid wherein the original cation A has been exchanged for the cation B and this solution will then be collected in the lower or receiving vessel 8 to be further treated in any desired way.

In order to regenerate the base exchanger material contained in the reservoir 4, use may be made of the pipe 17 and the three-way valve 16, which may be turned to shut off communication between the pipe 7 and the reservoir 8 and substitute instead a connection between the pipe 17 and the pipe 7 to the interior of the reservoir 4. The suitable regenerating liquid may then be forced in any desired way through the pipes 17 and 7 into and through the reservoir 4, wherein it regenerates the base exchanger material and said regenerating liquid may then be discharged by means of the pipe 2, into the upper reservoir 1, whence it may be discharged in any desired way, as through the pipe 18, having a valve 19 therein.

It will be understood, of course, that the entire drawing is purely diagrammatic and merely illustrative of the general purpose involved in the present invention and is not to be considered as in any way complete, drawn to scale, or otherwise limitative of the invention.

The process is generally carried out by first saturating the base exchanger or exchangers which should be used in form of appropriate sized grains with one of the cations which is intended to enter into reaction. Then a solution of a far lesser quantity of the second reacting salt is caused to flow through this base-exchange material, and finally an amount of saturating salt chemically equivalent to the second reacting salt, is run in solution slowly through the base-exchange material. These last two operations may be repeated alternately as often as may be wished; the salt solutions, collected separately, are concentrated if necessary.

Some cations of weak bases, for instance iron and some organic bases, do not react very easily with base exchangers. A good reaction can be obtained in these cases either by slightly acidifying the solution, or by using base-exchangers of more acid character, as boro, chromo-, zircono-hydrosilicates, or alumino hydrosilicates combined with these metallic derivatives.

The process thus outlined can be used for separating salt solutions of two or more cations, and for purifying salts. As it is obvious that base exchangers never will exchange their mobile cations against cations of a solution, unless these cations are different from theirs, it will be evident that a solution containing two cations, one of which is identical with the cation already existing in the base exchanger, will react with this base exchanger only in that the dissolved salt containing the same cation as the base exchanger, will leave this latter without having suffered any alteration at all, whereas the other cation will react completely with the base exchanger.

Thus, the process of separating and purifying salts in form of their solutions with the base exchangers is carried out as follows:

The base-exchanger is thoroughly saturated with a solution of a pure salt derived either from a former operation, or specially prepared. The thus saturated base-exchanger is then caused to be traversed either by a solution of the two salts which are to be separated and of which, one has the same cation as the base exchanger, or by one salt in solution, accompanied by its impurities. The accompanying foreign cations change their place with those fixed in the base exchanger, and the latter fixes them and liberates at the same time an equivalent quantity of its own cation, which is identical with that remaining in the liquid. Thus the liquid will leave the base exchanger with only one sort of cation, being thus a solution of a pure salt, if there was but one anion present. As soon as the base exchanger is saturated with the accompanying cation or the impurities, i. e. when the solution again begins to contain foreign cations, the base exchanger can be washed salt-free and the cation representing the undesirable admixture or the impurities can be either displaced by an alkaline salt, or by part of the pure solution of the principal pure salt, in which latter case this solution regenerates the base exchanger and makes it capable of beginning its purifying work anew.

This separating and purifying process can be used in many circumstances, as for example the production of pure, nickel-free cobalt-salt solutions from industrial, nickel-containing cobalt salts. The production of pure potassium salts from the mixed alkaline salts obtained in potassium mines, the preparation of iron-free aluminium sulfate from industrial aluminium sulfate, the separation of organic bases, the separation of which is difficult or incomplete with the technical processes heretofore known, as for instance isomeric amines, the separation of alkaloid mixtures obtained synthetically or by extraction, and the separation of which heretofore has been too complicated or difficult.

This reaction of base exchangers with cations in aqueous solutions is governed, as has been shown by a recent publication of one of the inventors of the present case (Comptes Rendus de l'Académie des Sciences, T. 193, P. 1013) by the law of extraction of a product dissolved in a solvent, with the help of another solvent non-miscible with the first. Thus the cation dissolved in form of a salt in water is extracted from this solution with the help of the non-miscible solvent, viz: the base exchanger. This extraction follows most precisely the laws found by Berthelot which govern all these sorts of extraction processes. In this special case of base-exchanging, the extraction process is accompanied chemically with the exchange of the cation taken out of the solution, against the cation which happened to be fixed on the base exchanger and quantitatively limits this chemical process. This implies that for a quantitative elimination of a cation from a solvent a certain excess of the extracting solvent is necessary. This excess can be exactly calculated with the help of the Berthelot extraction principle. In the case of the base exchanger as extracting solvent, and the salt solution as extracted solvent, the repartition coefficient will be determined by the concentration or more correctly by the solubilities of the two possible base-exchangers in the medium. These facts involve the following postulates:

(1) To extract one gram equivalent of a cation from an aqueous solution, a certain excess of the extracting base exchanger is necessary, which excess can be expressed by the amount N, this N being the number of gram equivalents of the other cation present in the base exchanger, which are necessary to extract one gram equivalent of the salt cation in solution, and similarly, to extract one gram equivalent of a cation of the base exchanger it is necessary to have an excess quantity of at least N' gram-equivalents of the other cation in the form of an aqueous solution. Both these numbers, N and N' are dependent upon the solubilities of the two possible base exchangers in the medium present (compare Comptes Rendus citation, supra).

(2) The mutual proportion of the cations of a solution reacting with a base exchanger has the tendency to converge towards the mutual proportion of these cations as they are fixed on the base exchanger itself, and vice-versa. Thus, if a solution containing two cations traverses a base exchanger which contains only one of these cations the solution will tend to change its composition so that it will contain only one cation, whereas the base exchanger will tend towards having two. Therefore, the solution will leave this base exchanger, if the latter is traversed gradually, free from the second cation, if only the base exchanger had enough excess of the first cation to react, and if the last layer of this base exchanger has not been called upon to give up something of its cation.

(3) If a solution having one cation is caused to react with a base exchanger containing two cations one of which is identical with that of the solution, the part of the base-exchanger saturated with this cation will not react, and will behave as if it were not present.

Upon the basis of these three points and the principles of the extraction law, it is evident that it will be much easier to effect quantitative reactions between two salts if a mixture of two base exchangers is used, and by using them both in the predetermined excess amount containing N and N' gram-equivalents of mobile cations respectively, if they are intended to carry out the reaction of one gram-equivalent of each of the two salts.

Thus potassium nitrate may be prepared by this process as follows: A certain amount of base exchanger is saturated exhaustively with a potassium salt, hereinbefore as described. Another amount of base exchanger is saturated in the same manner with a calcium salt: the amount of mobile cations in each of these two base exchangers must be exactly known. As it is necessary to employ N gram-equivalents of potassium cations and N' gram-equivalents of cations in base-exchangers in order to be able to mobilize one gram-equivalents of a calcium cation and one gram-equivalent of a potassium cation, respectively, and as it must be possible to do this at any moment, it is necessary to use a device containing both these base exchangers, one in the amount containing N gram-equivalents of potassium cations, the other in the amount containing N' gram-equivalents of calcium cations. In order to obtain the desired chemical reaction with the mixture of these two base exchangers, they must be arranged in a special manner in the apparatus or container in which the reaction will be carried out. This special arrangement is determined by points (2) and (3). For a reaction vessel, a vertical tube possessing means for introduction and evacuation of liquids at both its ends may be employed. This is charged first at the bottom with a layer of a base-exchanger, saturated thoroughly with potassium cations; this layer will occupy about 1/11th of the total volume of the tube; above this layer there is introduced another of the same amount, containing 90% of the potassium base exchanger and 10% of the calcium base-exchanger. The next layer will contain 80% of the first and 20% of the second, and so on with diminishing quantities of potassium base exchangers, till the last, the upper layer, will contain only a pure calcium base exchanger. This special stratification of the base exchanger will have the effect that saline solution entering the reaction vessel at one of its two ends, will, during its passage through this tube, continually meet the cation contrary to its own in increasing quantities and densities of charge in the tube. In order to transform 0.95 gram-equivalents of a calcium salt, in the present example, calcium nitrate into its equivalent amount of potassium salt, and 0.97 gram-equivalents of a (regenerating) potassium salt into its equivalent amount of calcium salt, the values of N and N' respectively, are 6 and 5 approximately. If the amount of mobile cations contained in each of the base exchangers of the said tube be known, and they are in this proportion, it is possible to determine immediately the amount of calcium nitrate or other calcium salt, which can be transformed into its equivalent amount of potassium nitrate or other potassium salt at each operation with this reaction vessel and, if the amount of calcium salts to be transformed into the equivalent amount of potassium salts, nearly quantitatively, be known, it is possible to determine easily the size of the reaction vessel needed, taking into consideration the time necessary to carry out the reaction between salt solution and base exchangers completely.

The tube thus filled with this specially arranged mixture of the two base exchangers is charged at its upper end with one gram-equivalent of calcium nitrate dissolved in water. Only the potassium base exchanger will react with this solution, the calcium base exchanger remaining untouched, and, as the last layer of the tube is a layer of potassium base exchanger only, the cation content of the solution will converge towards a composition of cations of this last layer, and the solution, after having taken up one gram-equivalent of potassium cations from the base exchanger of the tube instead of one gram-equivalent of its calcium cations left in it, will leave it as a solution of nearly one (exactly 0.95) gram-equivalent of potassium nitrate, which can be concentrated if necessary. At the same time the amount of N' gram-equivalent of calcium base exchangers will be increased by the one gram-equivalent of calcium cations left in the tube by the solution, so that after the first passage of a salt solution the tube will contain (N'+1) gram equivalents of calcium base exchangers. After this passage of the first calcium salt, solution the tube is reversed after washing, and thus the upper part of it will become the bottom part. It is now charged with the second, the regenerating solution, which is a solution of one gram-equivalent of potassium in the form of potassium chloride. This liquid will naturally progress in a direction contrary to the former direction, the tube being reversed. Now it is the potassium base exchanger which will not react and it is the calcium base exchanger which is present in an excess more than sufficient, (N'+1) gram-equivalent of calcium instead of N which will fix one gram-equivalent of potassium (K), handing over the corresponding gram-equivalent of Ca cation to the solution, which will leave the tube nearly potassium-free, as a $CaCl_2$ solution. Thus, this KCl solution will have taken away the gram-equivalent of Ca brought into the tube by the former calcium nitrate solution, putting one gram-equivalent of K in its place, and thus regenerating the tube to its first state, so that the tube will now again contain N gram-equivalents of potassium and N' gram-equivalents of calcium cations in the base exchangers just as before the passage of the two salt solution. Only the repartition of the two base exchangers will be slightly different. The tube thus will be capable of reacting indefinitely with any amount of potassium and calcium salts, the fluctuation between the successive applications being to the extent of one gram-equivalent of each. Thus the reaction:

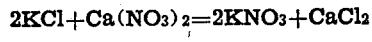

$$2KCl + Ca(NO_3)_2 = 2KNO_3 + CaCl_2$$

can be carried out by simply alternating charges of separate solutions of KCl and $Ca(NO_3)_2$ in stoichiometrical amounts in a tube thus filled with an adequate quantity of the two specially stratified base exchangers. The solutions and their washwaters are collected separately, the $KNO_3$ solutions are concentrated, and the calcium chloride solutions evacuated. The yield is nearly quantitative for the salts on the right side of the equation, and the salts obtained can be made with a precalculated purity. This method of making salts by double decomposition is quite general and every salt of a strong base can be thus caused to react with another salt. There is no difference in this respect between organic and inorganic salts. In the case of weaker bases, base exchangers of stronger acidity, as borochromo, zircono hydrosilicates or boro, chromo or zircono-alumino-hydro-silicates may be used, as well as slightly acidified solutions.

If the reaction is to be carried out with very large amounts of reacting salts the process may be carried out with the help of rotating continuous filters instead of tubes. The base-exchangers are fixed in some stable form on the periphery of the continuous filters and each segment of the periphery will contain the mixture of the two base exchangers with a different proportion of the two mobile cations, the total amount of base exchangers per segment being the same. The reacting liquid or salt solution is charged in the trough into which one part of the periphery of the filter is continually dipping. Thus one part of the total base exchanger mass is put in contact with a certain amount of salt dissolved in the liquid contained in the trough, which remains stationary, whereas the filter slowly revolves. New base exchanger masses of a varying composition are thus continually coming in contact with the trough and its liquid, and after one revolution of the filter, the reaction in the solution of the trough is complete. The result is, therefore, the same as though the salt solution in the trough had traversed a column made up of the various peripheral segments comprising the varying proportions of the two base exchangers. After this one revolution, the salt solution in the trough having completely reacted, is now transformed and can be evacuated. The trough can now be filled with the second (the regenerating) solution and the rotation of the filter reversed. After one revolution in this direction, the base-exchangers of the filter are regenerated and the solution in the trough used up for this purpose, and can be evacuated. By repetition of these two operations and automatic intermittent washing of the filtering periphery, the process can be made continuous. Another method to carry out the reaction in industrially large amounts is to work it with a battery of receptacles filled with the two base exchangers, the mixture of these being of a different composition in each vessel forming the battery, each of these vessels corresponding in its content of the base exchanger mixture to a corresponding one of the layers of the reaction tube as described above. This battery can be traversed by a flow of the two reacting solutions of salts in the two different contrary directions, with a washing operation interposed each time.

The same method of carrying out the reaction with specially arranged mixtures of two base exchangers can be used for the separation and purification of salt and other solutions, with the difference that the reacting solution is not to be introduced in this case at one of the ends of the reacting system (tube, filter, battery, etc.) but in the middle or more generally at that part of the reacting system at which the proportion of the two cations in the base exchangers is identical with the proportion of these cations in the salt solution to be treated. This salt solution must traverse the system in the sense of going towards the part or layer of base exchanger containing the cation which alone it is desired to retain in the solution. After reaction, the system is regenerated with a part of the pure solution obtained by the purifying process. This part must be sufficient (with regard to the excess N) to remove the quantity of impurities or of foreign cations fixed by the base exchangers system during the purifying operation.

This system of two base exchangers make it possible also to purify and sterilize water and other organic liquids economically.

If a potable, but bacterially contaminated water containing about 0.2% calcium sulfate (which is the degree of saturation for this salt) is made to traverse a system of two base exchangers mixed and stratified as described above, but in which the two mobile cations are calcium and silver, the calcium sulfate of the water will be transformed into silver sulfate, the concentration of which, while insufficient to precipitate, is yet strong enough to kill all the microbes and spores present in the water. This water, containing silver cations, is now made to traverse the same system of the two base exchangers which it just left, in an opposite direction and will leave there its silver cations and take up again its former calcium cations, but the time that the silver cations were present in the water has been sufficient to kill all the microbes contained therein, without itself being at all used up. Reversing the flow through the base exchanger system secures the result that the water is thus its own regenerating liquid. It will leave the apparatus with the same amount of calcium cations as it contained when it entered. In case the water should not contain enough calcium sulfate to give silver sulfate in sufficient concentration, it can be made to traverse a layer of gypsum before entering into contact with the base exchanger system and the unnecessary amount of Ca cations can be afterwards eliminated by the ordinary process of water softening through filtration by means of a layer of sodium-charged base exchanger. An analogous effect can be obtained with the help of cations of other heavy metals, if these have bactericidal properties, as cadmium, mercury etc, and not only for water, but also for liquids for which cold sterilizations may be of some importance, as wine, milk, organic extracts etc., waste water and so on.

This system of variable mixtures of two base exchangers may also be used, with adequate cations, to purify different industrial solutions as it makes possible not only the change of the cation, but also the quantitative elimination of complete molecules. It is sufficient in this case to choose as one of the cations fixed in the base exchanger, a cation capable of forming insoluble salts or precipitates with the anion or the products in solution in the liquid which is to be purified. Thus with a mixture of lead- (or silver-) base exchangers and sodium base exchangers, sea water may be de-salted in order to make it drinkable or applicable to boiler feeding. If sea water is filtered through a system as above described the sodium cation of the solution will extract the lead cation from the lead base exchanger (or respectively the silver cation) and this will immediately give, with the chlorine anion remaining in solution, a lead (or silver-) chloride precipitate. In case of the lead base exchangers the whole system is easily and inexpensively regenerable again by heating the system or by injecting steam or hot water, the lead chloride being far more soluble in hot water than in cold, and even more so in hot brine solutions, and will thus again immediately be taken up by the base exchanger which contains it before precipitation of the chloride. It is to replace the very slight amount of lead remaining dissolved in the first water, the former sea water. This amount of lead can itself be eliminated by filtration through an ordinary small water-softener, thus replacing the very slight amount of the remaining lead chloride by its equivalent of the corresponding sodium salt, which will not influence the taste.

This precipitating process with mixtures of two base exchangers can be used also for purifying sugar juices in different stages of sugar manufacture. The yield of undesirable molasses being proportional to the amount of salts and nitrogenous matter contained in the sugar juices, it is evident that if it is possible to precipitate these salts and impurities with the help of the above mentioned principle, the result will be a lesser amount of molasses and a higher yield of sugar. Diffusion juice of beet sugar contains for instance 1-1¼% of salts and impurities and about ⅔ of the former as phosphates, mostly of potassium. This anion can be easily precipitated by causing these or other technical sugar juices, even molasses suitably diluted, to react with a sufficient and suitably mixed amount of a mixture of potassium-calcium base exchangers or with an appropriate mixture of potassium and aluminium base exchangers. The alkaline cations will be fixed on the base exchanger and the anions precipitated in the form of calcium or aluminium phosphates and calcium and aluminium salts of certain organic acids, and also as precipitates with some other constituents of the juice giving insoluble precipitates. Thus a part of the nitrogenous matter and of the albuminoids and coloring matters will be precipitated and carried away with the clarified juice which can be freed from them by filtration or otherwise. The base exchanging system can be easily regenerated as described, through calcium or aluminium salts in solution, and the precipitates, together with the regenerating solution after its transformation, when it will contain a certain amount of potassium, may be collected and used as fertilizers. If necessary, the residual chloride and sulfate anions may be eliminated with the help of another system of lead- and sodium base exchangers, equally regenerable.

Examples

I. A vertical tube, 3.5 m. high and 0.24 m. in diam. is loosely filled with raw glauconite, (greensand, calcium-zeolite). A 15% KCl solution in water is charged through the upper end of this tube and is allowed to traverse the base-exchanger until the first traces of potassium cations begin to appear in the liquid leaving the tube at its lower end; then the tube is ready to work. After having been washed salt-free with water, a solution of 6 kg. calcium nitrate in 31 liters water is allowed to flow slowly through the tube; the rate of flow is such that the liquid will just have traversed the tube in 4 hours. The solution leaving the tube contains nearly pure (95%) potassium nitrate. The tube is washed salt-free, the lower end of it turned upwards, and a solution of 7.5 kg. of potassium chloride in 32 liters water is run through the tube in 4 hours. Thus the potassium taken away as potassium nitrate is restored to the tube, and the regenerating solution, leaving it, contains only nearly pure (97%) $CaCl_2$. After washing, the tube is again reversed and the same quantity of 6 kg. calcium nitrate in 31 liters water charged thereinto; these two operations can be alternately carried out indefinitely; the result is the production of 0.4 to 0.5 kg. of potassium salt per hour in the present example in the form of a 13% potassium nitrate solution.

II. Artificial zeolite, used in an amount of 1 cubic metre in an analogous manner, gives a yield of 1.75 kg. potassium cyanide per hour in the form of a 20% solution, by using alternately 2 kg. of sodium chloride dissolved in 9 liters water and 1.35 kg. of potassium cyanide dissolved in 8 liters water, as reactants with the abovesaid amount of artificial base-exchanger saturated with potassium salt.

III. The tube of Example I is filled with greensand (glauconite) previously completely saturated with sodium cations and an 8% copper-sulfate solution is run slowly through it, till some copper begins to appear in the liquid leaving the lower end of the tube. This is now washed salt-free, reversed and a solution of 8.2 kg. fused sodium acetate in 45 liters water slightly acidified with acetic acid run through it in three and one-half hours. The liquid leaving the tube consists of nearly pure copper acetate solution, which can be concentrated; the tube is washed, the wash-waters used to dissolve 12.5 kg. copper-sulphate and this solution brought to 90 liters; this is run through the reversed tube in order to regenerate it. This reaction can also be repeated indefinitely.

IV. 200 kg. of glauconite are completely saturated with a sodium chloride solution or with sea water and mixed with 8 kg. of finely ground gypsum (calcium-sulphate). The mass is watered alternately with 14 liters of water and 20 liters of sea water, and both solutions collected separately. The result of the watering with ordinary water gives a solution of sodium sulphate, which can be evaporated and the result of the watering with sea water is the regeneration of the base exchanger into sodium glauconite, the liquid leaving the mass being a nearly pure $CaCl_2$ solution; the sea water does not dissolve the gypsum, so that it is necessary only to replace it in the mass in amounts equivalent to what is carried away as sodium sulphate.

V. Greensand is filled into a tube as described in Example I and completely saturated with a 10% solution of chemically pure cobalt nitrate until the liquid leaving the tube contains the same content of cobalt as the liquid entering it. After washing, the tube is charged with a 10% solution of technical cobalt nitrate, containing nickel nitrate in the ratio of about 1:12 of the cobalt nitrate. The solution leaving the tube will contain very pure cobalt nitrate. The tube can be regenerated by running a 10% solution of 2 kgs. of pure cobalt nitrate slowly through it after having reversed it.

VI. Artificial zeolite is saturated with a solution of 6% of pure m-xylidine hydrochloride in water slightly acidified with hydrochloric acid; it is then washed and treated in the same way as described with 2½–3 times its weight of crude xylidine hydrochloride, containing all the 3 possible isomers, in a 6% acidified solution. The liquid leaving the zeolite will be a pure 6% solution of m-xylidine hydrochloride; the accompanying bases can either be discharged with a slightly acid sodium chloride solution, or extracted as bases with a volatile solvent, or even distilled over with steam.

VII. Into a tube of 1 m. height and 10 cm. diam. a mixture of 7.2 kgs. glauconite in all, made up from 3.35 kg. sodium glauconite and 3.85 kg. of potassium glauconite is filled in 11 layers of equal weight but different composition, in the following way: The lowermost layer consists of 600 gr. pure potassium glauconite; the next contains 95% potassium glauconite and 5% sodium glauconite, the third layer: 92% potassium and 8% sodium-glauconite, and so on, the successive layers of 600 gr. each containing 90%, 81%, 70%, 49%, 33%, 20%, 11% and 6% of potassium glauconite, the rest being sodium-glauconite, and the last, the uppermost layer being pure sodium glauconite. A solution of 25 gr. sodium cyanide in 1.4 liters water is run through this tube in 30 minutes; the yield is 30 gr. of potassium cyanide contained in the original solution and in the washwaters together. The tube is reversed and regenerated with a solution of 31 gr. KCl in 1.2 liters water. This tube, being charged alternately with 25 gr. NaCN and 31 gr. KCl in solution, is thus capable of giving quantitative yields of corresponding amounts of KCN and NaCl in solutions collected separately, the operations being susceptible of any amount of repetition.

VIII. Into a tube as described in Example VII, 7 kg. of a mixture of sodium and potassium glauconite is loosely filled in the following way: The lowermost layer of 1 kg. is again pure potassium glauconite; the next one, of the same weight contains 97.5% potassium and 2½% sodium-glauconite, and so on, the following layers containing 4.5%, 5%, 8%, 10%, and 13% sodium glauconite. After filling, the tube is slightly wetted and a solution of 56 gr. crude potassium chloride in 3 liters water is run through; this crude KCl is a mixture of 84% pure KCl and 14% of NaCl. The solution leaving the tube is a chemically pure solution of KCl, free from sodium salts. ¼ of the resulting liquid is used to regenerate the tube, the solution is diluted to ¾ liter, the tube reversed and this pure liquid passed slowly through it enabling it thus again to purify the former amount of crude potassium salts, but care must be taken in selecting the place at which the liquid to be purified is introduced into the tube, the best place being at the layer whose percentage of sodium cation in the mass is the same as that of the solution.

We claim:

1. The process of preparing a salt by means of base exchangers which comprises initially saturating base exchanger material with the cation of the said salt, by passing therethrough a solution containing the cation of the salt which is to be prepared until the said cation of the treating solution begins to appear in the effluent, whereby a mixture of base exchangers having two cations is produced, thereupon causing the said base exchanger material in predetermined excess to react with a second salt, the anion of which is desired, by passing a solution of said second salt therethrough the reaction being caused to take place gradually, thereupon again causing the base exchanger material to react with a salt, the cation of which is finally desired in combination with the said anion, in stoichiometrical proportion to the second salt, the two last-named reactions being carried out alternately and slowly and in opposite directions of flow to one another.

2. A process of preparing salts by means of base exchangers which comprises providing base exchanger material containing base exchangers which are separately saturated each with one of the two cations of the two reacting salts, arranging said base exchangers in layers in mixtures such that layers having different contents of the two base exchangers are produced, the layers containing a gradually increasing proportion of one, and a gradually decreasing proportion of the other material, and passing through the base-exchanger material first a solution containing one of the salts which is to react, so that the base-exchanger mass which reacts will be present in a predetermined excess sufficient to retain substantially all the cation of the salt in solution, and then passing, in counter-current to the first, a solution of the second reacting salt in stoichiometrical amount to the former, and under the same conditions of excess, so that each solution in flowing through the material progressively encounters base exchangers which contain increasing amounts of the cations of the salts that are to be produced, the first contact of a salt solution being always with the base-exchanger layer having the same cation as the solution itself.

3. A process for separating and purifying salts by means of base exchangers which comprises providing material consisting of a mixture of two base exchangers arranged in a series of layers, each containing both of the cations which enter into the reaction, each layer having a different proportion of the two base exchangers, one of said base exchangers progressively increasing in amount and the other decreasing, running a solution of the salt which are to be purified and separated through the said material, introducing the said solution, first, into that layer of the material which has a proportion of cations corresponding to the proportion in the solution and causing the solution to flow through the base exchanger material in such direction that it progressively encounters base exchanger material containing increasing quantities of cations of the salt which is to be produced in the pure state.

4. A process for purifying salt solutions and other liquids by means of base exchangers of the kind and arrangement as in claim 3, which consists in subjecting the said solutions and liquids to the action of an excess of a mixture of base exchangers, one of the said base exchangers being saturated with a cation which produces readily eliminable substances with the anions and other products, dissolved in, and to be eliminated from, the liquids and solutions which are to be purified.

5. A process for purifying salt solutions and other liquids by means of base exchangers of the kind and arrangement as in claim 3, which consists in subjecting the said solutions and liquids to the action of an excess of a mixture of base exchangers, one of the said base exchangers being saturated with a cation which produces insoluble substances with the anions and other products, dissolved in, and to be eliminated from, the liquids and solutions which are to be purified.

6. A process for purifying salt solutions and other liquids by means of base exchangers of the kind and arrangement as in claim 3, which consists in subjecting the said solutions and liquids to the action of an excess of a mixture of base exchangers, one of the said base exchangers being saturated with a cation which produces difficultly soluble substances with the anions and other products, dissolved in, and to be eliminated from, the liquids and solutions which are to be purified.

7. A process for purifying salt solutions and other liquids by means of base exchangers of the kind and arrangement as in claim 3, which consists in subjecting the said solutions and liquids to the action of an excess of a mixture of base exchangers, one of the said base exchangers being saturated with a cation which produces volatile substances with the anions and other products, dissolved in, and to be eliminated from, the liquids and solutions which are to be purified.

8. A process for treating liquids containing salts in solution and other constituents in solution and suspension, with a predetermined excess of base exchanger material of the kind and arrangement as in claim 3, and containing two kinds of mobile cations, one kind being also present in the liquid being treated, the base exchanger material being arranged in successive portions differing in composition and varying gradually from one in which certain of the cations alone appear to another in which other cations alone are present, gradually changing from one to the other, and causing the liquid which is to be treated to be brought into contact gradually with the said base exchanger material, one of the mobile cations being such as to form, with the anions and other constituents present in the liquid, compounds which may be readily removed by mechanical processes.

9. A process for treating liquids, containing dissolved salts and in certain cases other constituents, in solution and suspension, to free the said liquids from germs, which comprises treating the liquids with a predetermined excess of base exchanger material of the kind and arrangement as in claim 3, and containing two kinds of mobile cations, the base exchanger material being arranged in portions of different compositions varying gradually from one containing one certain kind of cation alone to one containing another cation alone, the transition from one to the other being gradual, bringing the liquid gradually into contact with the said base exchanger material, the second cation of which has the property of producing germicidal solutions whereby a sterilizing effect is produced when these cations have passed into solution, and thereafter causing the sterile solution to flow in the opposite direction through the same base exchanger material whereby to regenerate the base exchanger material substantially into its original condition.

10. A process for treating liquids, containing dissolved salts and in certain cases other constituents, in solution and suspension, to free the said liquids from germs, which comprises treating the liquids with a predetermined excess of base exchanger material of the kind and arrangement as in claim 3, and containing two kinds of mobile cations, the base exchanger material varying gradually from one containing a certain kind of cation alone to one containing another cation alone, the transition from one to the other being gradual, bringing the liquid gradually into contact with the said base exchanger material, the second cation of which has the property of producing germicidal solutions whereby a sterilizing effect is produced when these cations have passed into solution, and thereafter causing the sterile solution to flow in the opposite direction through the same base exchanger material whereby to regenerate the base exchanger material substantially into its original condition.

GÉZA AUSTERWEIL.
CHARLES JEANPROST.